Patented Sept. 27, 1932

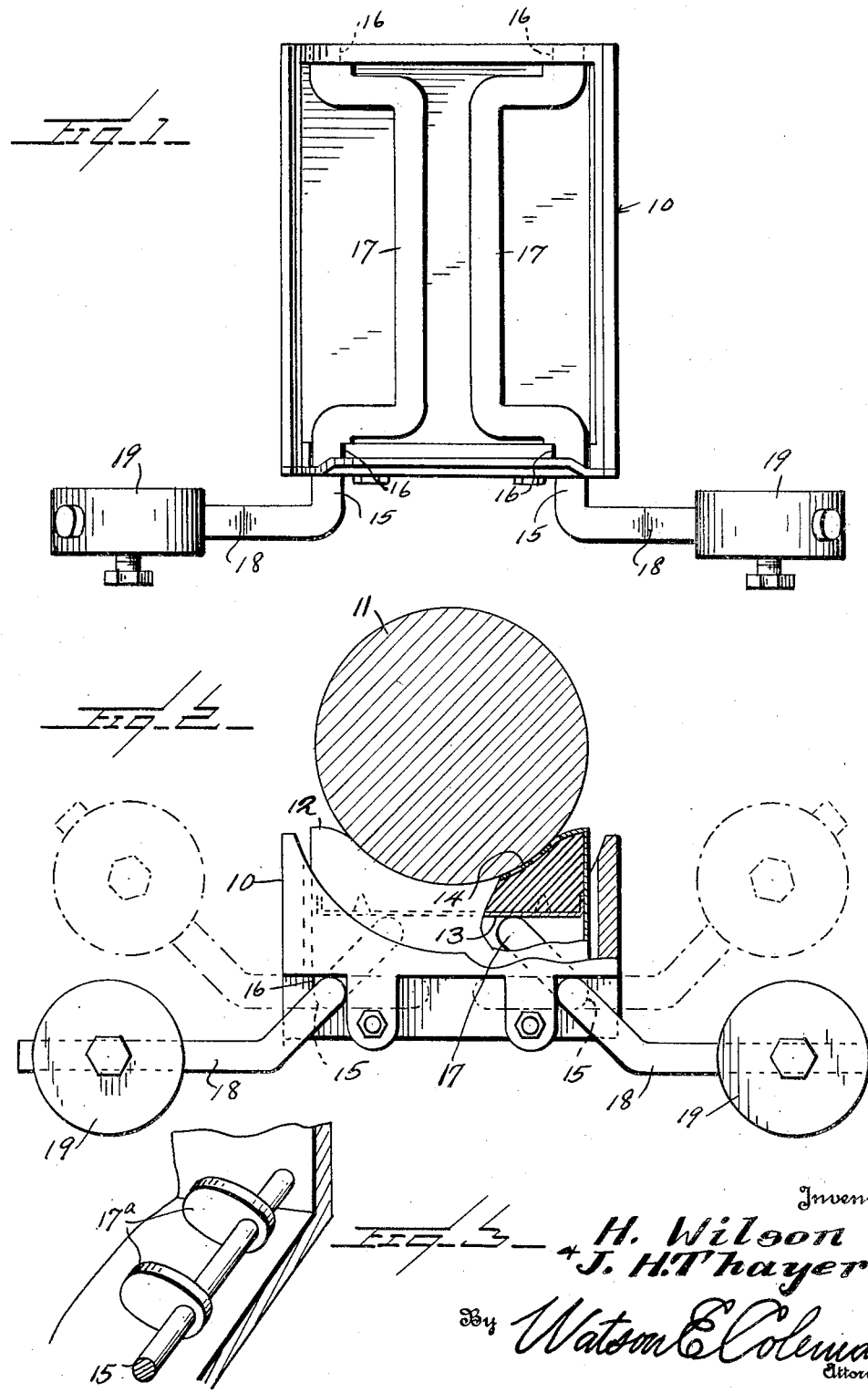

1,879,723

UNITED STATES PATENT OFFICE

HUGH WILSON, OF GRAND JUNCTION, COLORADO, AND JAMES H. THAYER, OF SALT LAKE CITY, UTAH

LUBRICATING DEVICE FOR FRICTION BEARINGS

Application filed December 31, 1930. Serial No. 505,831.

This invention relates to lubricating means and particularly lubricating means using hard grease in the form of a cake, the invention being particularly applicable, though not necessarily limited to means for lubricating, by blocks of hard grease, journals, such as locomotive journals, having driving rods and reciprocating parts attached thereto.

It is common practice in locomotive journals having reciprocating parts attached thereto to use solid grease for the purpose of lubrication, this grease cake being carried by a pressure plate, the grease being urged against the journal by a spring or springs acting to force the grease into contact with the journal. Such springs develop uncertain pressure against the grease carrier and oftentimes, no pressure whatever and this results in hot and scored journals due to improper lubrication.

With journals and heavy bearings having no reciprocating parts attached thereto, as for example car journals, engine truck and trailer truck journals and the like, the common method of applying lubrication has been through the use of cotton or wool waste soaked in oil and disposed within a box beneath the journal. Heretofore it has been found impossible to properly lubricate with solid grease such journals on account of a lack of impact. For such journals and bearings complete dependence has heretofore been placed on capillary attraction, acting to draw the oil upward against the journal. This results in hot journals due to variations in the amount of lubricant disposed in the box containing the waste and in exact knowledge as to how far that lubricant has been used up. Lubricating journals and other heavy bearings by the use of grease cakes, is direct, safe and dependable provided the grease cakes can be kept constantly under proper pressure and in juxta position with relation to the journal.

One of the objects of the present invention is, therefore, to provide gravity-actuated means for urging a block of grease up against the journal and a further object in this connection is to provide a construction of this character which is particularly adapted to those journals having reciprocating parts connected thereto inasmuch as the jar caused by the reciprocating parts will cause the gravity actuated weights and levers to urge and cause the grease cake to impact against the journal.

A further object is to provide a construction of this character which is also adapted to be used where one portion of the grease cake must be forced with greater force against the journal than another portion of the grease cake.

A further object is to provide a construction of this character which is very simple and compact in construction so that there will be no complicated parts to get out of order, nor parts liable to break under the jar incident to railroad travel and no parts which when placed upon a car axle will be likely to be knocked off on account of proximity to the road bed, and furthermore to provide a lubricating device which adapts itself to the very contracted space capable of being used for this purpose in a locomotive journal box.

Our invention is illustrated in the accompanying drawing, wherein:—

Figure 1 is a plan view of a cellar for journal bearings, the grease cartridge and pressure plate being removed;

Figure 2 is an end elevation of the structure shown in Figure 1, but with the grease cartridge and support in place and showing a journal in cross section;

Figure 3 is a fragmentary perspective view showing a modification of the structure shown in Figure 1.

Referring to this drawing, 10 designates the walls of a grease cellar used in conjunction with the journal 11. This grease cellar is of any ordinary or suitable construction. 12 indicates a grease cartridge of any suitable or usual type and 13 the pressure plate ordinarily disposed below the grease cartridge and upon which the cartridge rests.

It will be understood that this grease cartridge 12 may be of any suitable character and that ordinarily the block of grease within the cartridge is covered by a perforated plate 14 which bears directly against the journal 11. The particular character of the grease cartridge has nothing to do with our invention.

The grease contained in the cartridge is such as ordinarily used, that is, is a mixture of lye, soap and locomotive valve oil, together with a small amount of asphalt and various other ingredients designed to secure the proper degree of hardness and lubricating qualities. Ordinarily the pressure plate is supported by means of a spring or springs and experience has shown that in order for the journal to be properly lubricated a very strong spring is required. The space for the operation of the spring is very limited and as a result the spring usually proves ineffective. The grease is not forced against the journal properly, the journal becomes hot, the spring is destroyed by the heat and the journal box has to be temporarily re-packed at the next station and when the engine is put in the roundhouse at the end of the run, the journal bearing is usually found to be so severely scored that it requires re-facing.

In view of the practical disadvantages above referred to found in the use of springs for the purpose of urging the grease upward against the journal, we provide shafts 15 disposed in parallel relation to each other and rotatively mounted in the lateral walls of the cellar 10 as at 16. Each of these shafts in the embodiment illustrated in Figure 1 is formed with a cranked portion 17 disposed within the walls of the grease cellar 10 and bearing against the pressure plate 13. At one end, each of these shafts 16 is provided with the outwardly projecting arm 18 having thereon an adjustable weight 19.

It will be obvious now that gravity will urge the weights downward and thus urge the cranked portions of the shafts upward and thus urge upward on the pressure plate and the grease cartridge and urge the face of the grease against the journal. Because of the fact that as the grease cartridge is consumed the weights 19 gradually lower and thus would ordinarily cause the cranked portion 17 to exert a greater pressure than when the weights are in an upward position, the arms 18 are angular so as to equalize the pressure of the weights in all positions of the weights. However, we do not wish to be limited to this as the arms might be straight. Neither do we wish to be limited to the use of the cranked or eccentric portions 17 inasmuch as, as illustrated in Figure 3, the shafts 15 might be straight and carry upon them cams 17a, these cams bearing against the under face of the plate 13 and urging the plate upward. While in the drawing we have illustrated the shafts 15 as extending parallel to the journal, with the levers or arms 18 at right angles to the journal, we do not wish to be limited to that as in all installations where the available space makes it more convenient, the shafts 15 may be placed at right angles to the journal. Furthermore, the levers and weights may be disposed either inside or outside of the grease cellar depending upon the most desirable installation for the particular type of journal.

In the lubrication of locomotive journals, it is oftentimes found that more grease is consumed at the end of the journal nearest the drive wheel than at the other end of the journal and consequently it becomes necessary to raise the pressure plate, at the end where more grease is consumed, a greater distance than where less grease is consumed. This may be accomplished by graduating the cams 17a in an obvious manner. Particular attention is called to the fact that when this device, as above described, is attached to a journal which has reciprocating parts connected thereto, that is, a journal for instance which is connected with the drive rod of the engine or connected to a crank or something of this nature, there is always a jolt or jar at every revolution of the shaft or journal and with the construction illustrated, this jar or impact is transferred to the fulcrum and weights, causing the weights to vibrate and transmit this impact to the hard grease in the cartridge. Thus the grease is forced against the journal not only by the constant pressure of the weights, but by the constant vibration of the weights under jar. Where springs are used, very little of this impact is transmitted to the grease and only where the jar is very strong is there any transfer of this impact to the grease itself. Our device is, therefore, adapted to be used on the journal connected with the main driving rod of a locomotive and on all other drive journals where rods are only auxiliary rods and where the impact is never very great. Many experiments have been made looking to the lubrication of car journals by the use of hard grease, but these have been unsuccessful as far as known to us because there is not sufficient impact secured. With this construction, even where there is no reciprocating part or parts attached to the journal, there will be sufficient impact due to the jolts or jars given to a car or engine by the joints in the rails and other road bed irregularities.

While we have illustrated a form of our invention which has been put into successful use and which has been found very effective, we do not wish to be limited to this, as obviously many changes might be made in the details of construction and arrangements of parts without departing from the spirit of the invention as defined in the appended claims.

We claim:—

1. The combination with a journal, a lubricant containing cellar associated therewith, and a grease cartridge disposed within the cellar beneath the journal and having vertical movement within the cellar toward the journal, of shafts passing through the cellar and mounted for oscillation therein, each of said shafts having radially directed weighted arms, and each of said shafts having eccentric portions thereon operatively bearing against the grease cartridge and at all times urging it upward against the journal.

2. The combination with a journal and a lubricant containing cellar coacting therewith, a grease cartridge disposed within the cellar and bearing against the journal and a pressure plate disposed beneath the cartridge and movable upwardly therein, of means for urging the pressure plate upward comprising opposed shafts provided with eccentric portions bearing against the under face of the pressure plate, said shafts having outwardly projecting arms provided with weights.

3. The combination with a journal and a lubricant containing cellar coacting therewith, a grease cartridge disposed within the cellar and bearing against the journal and a pressure plate disposed beneath the cartridge and movable upwardly therein, of means for urging the pressure plate upward comprising opposed shafts provided with eccentric portions bearing against the under face of the pressure plate, said shafts having outwardly projecting arms provided with weights, the arms being angular whereby the outer ends of the arms shall extend upward and outward when the inner ends of the arms are in a horizontal position.

4. The combination with a lubricant containing cellar for a journal having a grease cartridge mounted therein, of weight operated means constantly urging the grease cartridge bodily upwardly against the journal and including shafts disposed in parallel relation to and extending through the cellar, the shafts having cranked portions operatively bearing against the grease within the cartridge and having weighted arms urging the cranked portions upward.

5. The combination with a lubricant containing cellar for a journal box having therein a grease cartridge and a pressure plate bearing against and supporting the grease cartridge, of means constantly urging the pressure plate upward comprising two shafts extending parallel to each other, the shafts having radially extending arms provided with weights, each of said shafts having eccentrics thereon bearing constantly against the pressure plates.

JAMES H. THAYER.
HUGH WILSON.